United States Patent [19]

Bruehl et al.

[11] Patent Number: 4,926,981

[45] Date of Patent: May 22, 1990

[54] ESCALATOR STEP BUFFER

[75] Inventors: Klaus Bruehl, Hanover; Dietmar Thaler, Seggebruch, both of Fed. Rep. of Germany

[73] Assignee: Otis Elevator Company, Farmington, Conn.

[21] Appl. No.: 368,476

[22] Filed: Jun. 19, 1989

[51] Int. Cl.[5] .............................................. B60T 17/18

[52] U.S. Cl. .................................... 188/111; 188/287; 198/323

[58] Field of Search ...................... 187/73, 90; 188/32, 188/38.5, 111, 279, 280, 283, 284, 287; 198/322, 323, 330

[56] References Cited

U.S. PATENT DOCUMENTS

| | | | |
|---|---|---|---|
| 1,659,968 | 2/1928 | Woodward . | |
| 1,695,083 | 12/1928 | Blackburne | 198/323 X |
| 2,846,029 | 8/1958 | Cawley | 188/287 |
| 3,547,236 | 12/1970 | Liesegang | 188/280 |
| 4,433,628 | 2/1984 | Wakabayashi | 188/111 X |
| 4,635,907 | 1/1987 | Bialy et al. . | |

FOREIGN PATENT DOCUMENTS

| | | | |
|---|---|---|---|
| 1255130 | 11/1967 | Fed. Rep. of Germany | 188/111 |
| 250924 | 2/1964 | Netherlands | 188/111 |

*Primary Examiner*—Duane A. Reger
*Attorney, Agent, or Firm*—William W. Jones

[57] ABSTRACT

An hydraulic buffer or brake is provided on an escalator to stop movement of the steps in case power is interrupted, or if a safety device is activated. The braking action occurs in parallel to the inclination of the step chain. The braking action occurs in several stages so that a maximum time delay between initiation of the device and stopping of the steps can be achieved. In the first stage, the braking force is more solely applied, so that the first stage can affect a stopping of an empty escalator when completed. In the second stage the braking force is more quickly applied, so that the first and second stages can affect a stopping of a heavily loaded escalator in concert in the same maximum deceleration as the first stage can, when completed stop the lightly loaded escalator.

6 Claims, 4 Drawing Sheets

ESCALATOR STEP BUFFER

DESCRIPTION

Technical Field

This invention relates to an emergency buffer or brake for an escalator, and more particularly to an hydraulic escalator brake which acts directly on the step axles in a direction parallel to the direction of movement of the escalator.

Presently, when the power to an escalator is interrupted, or when the escalator is deactivated for emergency reasons, the chain sprocket shaft will be braked by means of a pair of brake shoes which are applied to a brake disk mounted on the sprocket shaft. The braking force is thus applied to the escalator steps indirectly through the step chain which is entrained on the chain sprocket. One problem which arises with regard to this type of brake is the sudden way that the steps are brought to a halt. Another problem found with this type of brake is that it requires that the chain maintain its integrity. In other words, if the chain breaks, the steps will not be halted by this type of brake. It will be recognized that this type of brake inherently places undue stresses on the chain.

BACKGROUND ART

It has been suggested in U.S. Pat. No. 1,659,968, Woodward, granted Feb. 21, 1928, to utilize spring biased pawls for engaging the step axles of an escalator to stop movement of the steps in the event that the escalator step chain breaks. This patent discloses the use of the above-noted sprocket shaft disk brakes, and also suggests the use of the pawls in case the conventional brakes fail. The pawls are ordinarily held below the path of travel of the step axles by a solenoid-type catch. If the step chain breaks, the solenoids are deactivated, and a spring is operable to pivot the pawls up into positions where they will engage the step axles and stop the steps. The problem with the Woodward assembly is that the steps are stopped very suddenly by the pawls, and there is no differentiation of the force needed to stop the escalator when the latter has varying loads. In both cases with Woodward the steps are brought to a sudden, jolting stop.

DISCLOSURE OF INVENTION

This invention is directed to an hydraulic emergency brake for an escalator, which brake acts directly on the steps of the escalator. The brake is a multi-phase brake which requires the use of only the first phase to stop an empty escalator. When the escalator is heavily loaded more than one of the operational phases of the brake will be used, and the first phase will provide a soft initial application of braking forces to the escalator. In either case, the escalator will come to a stop within a predetermined maximum distance from the initial actuation of the brakes. Most of the existing braking energy is converted into heat by swirling of the hydraulic fluid in the brake assembly.

The brake assembly of this invention includes a catch or pawl which when actuated is operable to engage step axles of the escalator. The pawl is held in an inoperative position by an electromagnetic sear. When current to the sear is interrupted for any reason, the pawl will be moved to its operative position by a spring which is compressed when the sear is energized. The pawl is mounted on a piston rod along with the sear, and the rod is connected to a piston. The piston is reciprocally slideably mounted in a perforated sleeve which, in turn is mounted in a cylindrical housing. The perforations in the sleeve provide hydraulic fluid flow paths from the interior of the sleeve to the housing surrounding the sleeve. The perforations are grouped into several stages, with each stage having a predetermined number of perforations of predetermined size. The perforations are spaced predetermined distances along the axis of the sleeve so that the length of the piston stroke into the sleeve will determine how many of the perforations are overridden by the piston. Each of the perforations is provided with a one-way check valve so that the perforations will normally be closed unless the hydraulic fluid in the sleeve is pressurized by the piston. This will occur when the pawl is actuated to engage the moving step axles. When the pawl engages the step axle, the piston will be pushed into the cylinder. As the piston overrides the perforations in the first phase, the braking force will increase, but at a relatively slow rate so that the braking action is a soft, gentle reaction to the step movement, whereby the steps are never jolted. With light loads, the first phase will be sufficient to stop movement of the escalator in the maximum distance desired. If and when the second braking phase is reached, the braking force will increase at a more rapid rate than in the first phase. Thus the braking force over the two phases is always increasing, but the rate of increase in the second phase is greater than in the first phase. The braking action always is more gentle initially, and the steps are never jolted to a halt.

It is therefore an object of this invention to provide an improved escalator step brake which stops movement of escalator steps when necessary by direct engagement with one or more of the steps.

It is an additional object of this invention to provide an escalator step brake of the character described which stops the steps smoothly without jolting the steps.

It is a further object of this invention to provide an escalator step brake of the character described which has a plurality of operational phases during which the braking force increases at different rates.

It is another object of this invention to provide an escalator step brake of the character described wherein the braking force applied to the steps is slowly increased in the first operational phase, and more rapidly applied to the steps in subsequent operational phases.

These and other objects and advantages of the invention will become more readily apparent from the following detailed description of a preferred embodiment thereof when taken in conjunction with the accompanying drawings, in which:

BEST MODE FOR CARRYING OUT THE INVENTION

Figure 1:
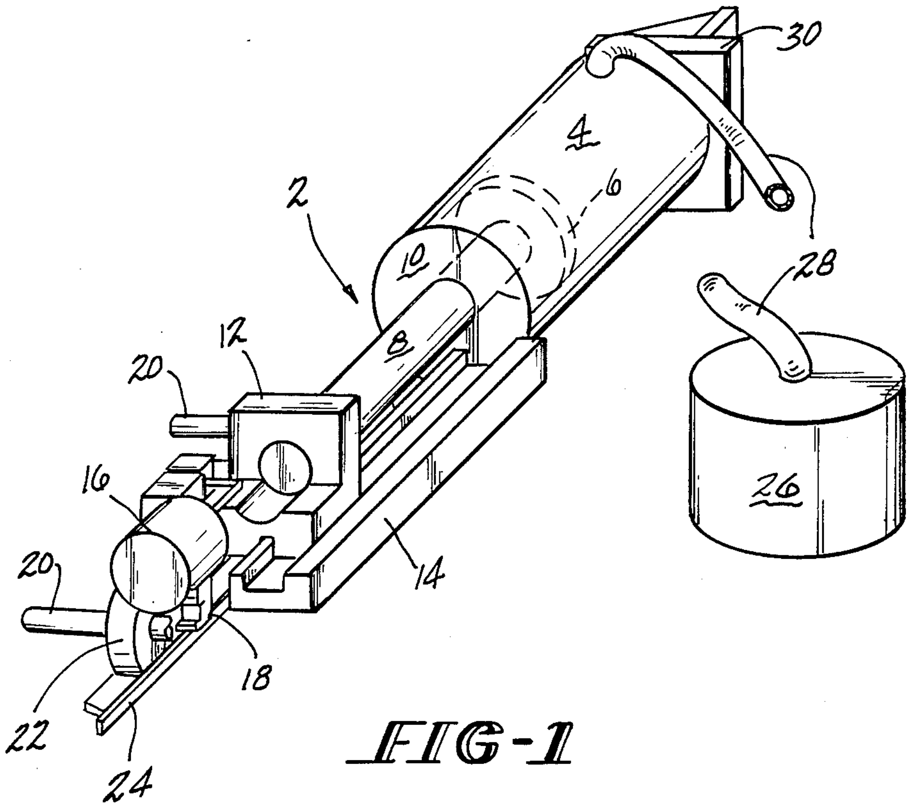
FIG. 1 is a perspective view of an escalator step buffer assembly formed in accordance with this invention.

Referring now to FIG. 1, a preferred embodiment of the buffer or brake assembly, denoted generally by the numeral 2 is shown. The assembly 2 includes a cylinder 4 which receives a piston 6 mounted on a piston rod 8. The end wall 10 of the cylinder 4 is closed to provide a sealed guiding surface for the piston rod 8. A sled 12 is mounted on the distal end of the piston rod 8 and moves over a guide track 14 secured to the escalator truss (not shown). A solenoid sear 16 is mounted on the sled 12, and a braking pawl or catch 18 is pivotally mounted on the sear 16. The pawl 18 is spring biased toward a latching or braking position shown in FIG. 1, in which position the pawl 18 will engage one of the step axles 20 on the escalator. It will be understood that the step axles are mounted on escalator steps and carry rollers 22 which roll along a track 24 toward the cylinder 4. The spring which biases the pawl 18 to its braking position will be disabled by the solenoid 16 so long as the latter is energized, so that while the escalator is operating properly, the pawl 18 will be displaced upwardly above the path of movement of the step axles 20 so that the latter will pass freely past the assembly 2. When a braking situation arises, the solenoid 16 will be deenergized and the pawl 18 will drop to its braking position to be engaged by the next step axle in the series thereof. The cylinder 4 is connected to an hydraulic fluid storage reservoir 26 by a hose 28. The cylinder 4 is mounted on a base plate 30 which is fixed to the escalator truss.

Figure 3:
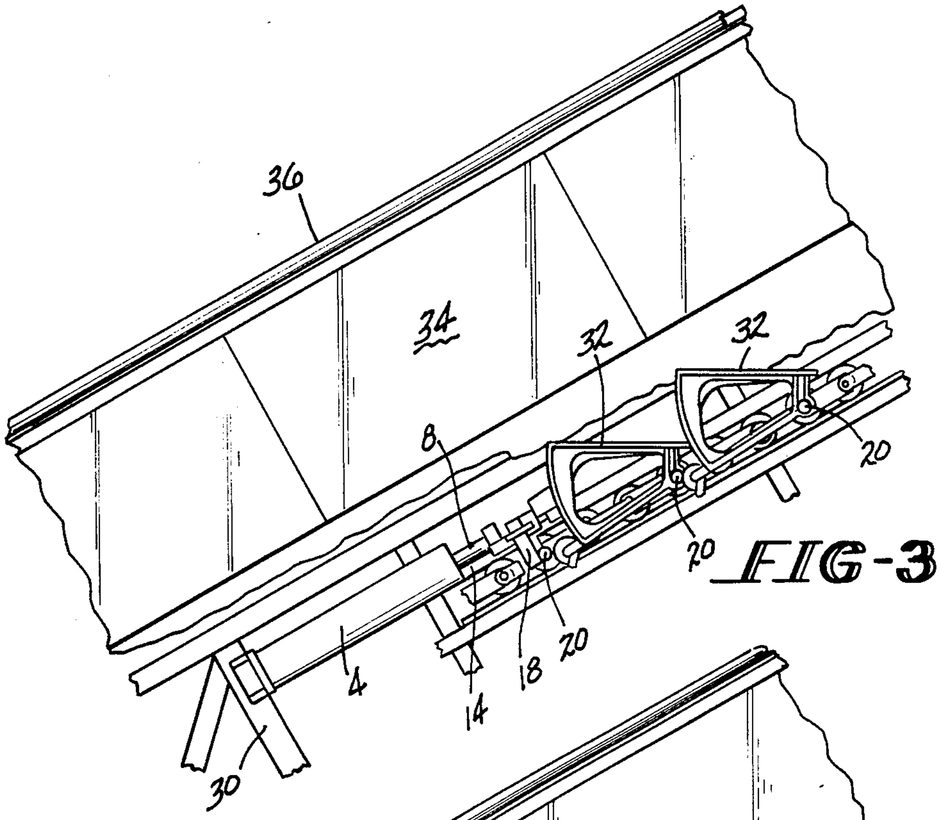
FIG. 3 is a side sectional view similar to FIG. 2 but showing the buffer assembly engaging the step axle of one of the steps to stop movement of the escalator steps.
Figure 2:
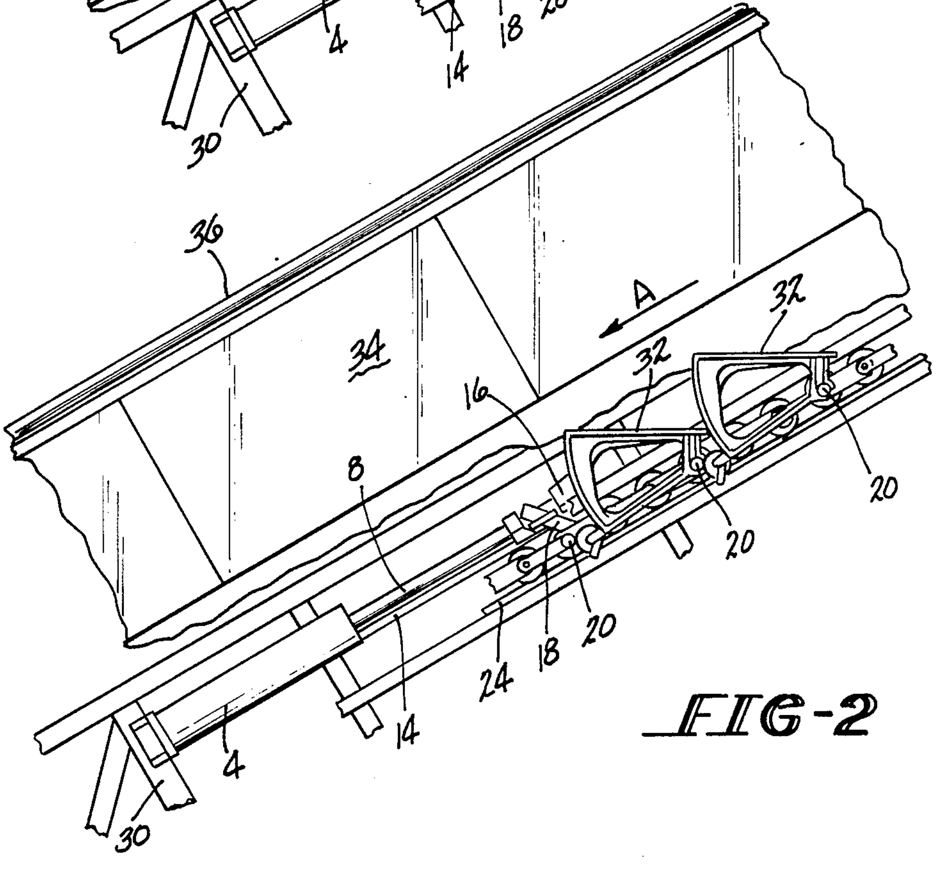
FIG. 2 is a side sectional view of an escalator showing the buffer assembly mounted beneath the escalator steps.

Referring now to FIGS. 2 and 3, the piston 8 is shown in its extended position with the pawl 18 upwardly offset from the path of travel of the step axles 20 in FIG. 2. In this mode, the steps 32 will move in the direction of arrow A between the balustrades 34, on which moving handrail 36 is mounted, in the normal operating manner. When a braking situation arises, the solenoid 16 is deenergized, and the pawl 18 drops to its braking position as shown in FIG. 3, where it engages a step axle 20. This causes the piston 6 and rod 8 to be driven into the cylinder 4. Movement of the piston 6 into the cylinder 4 forces hydraulic fluid through the hose 28 into the reservoir 26, thus slowing and stopping the steps 32.

Figure 5:
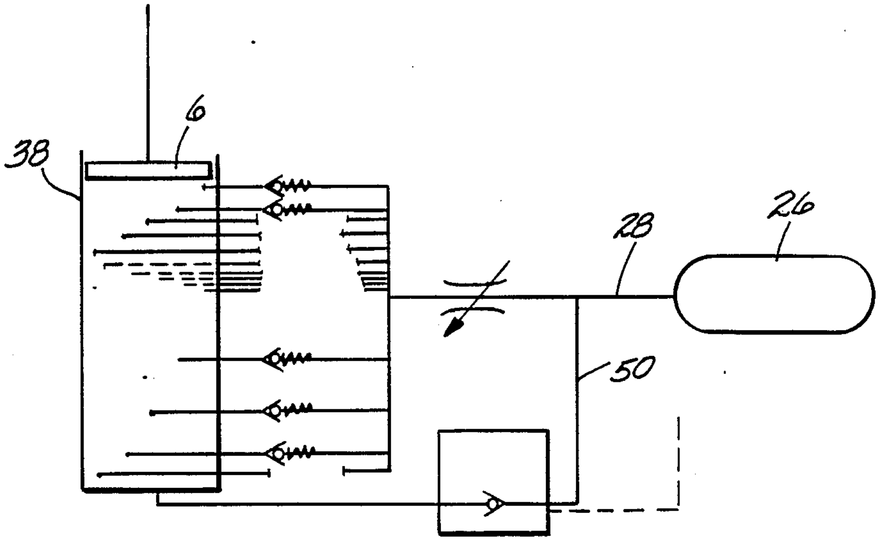
FIG. 5 is a schematic representation of the piston, cylinder, sleeve and tank.
Figure 4:
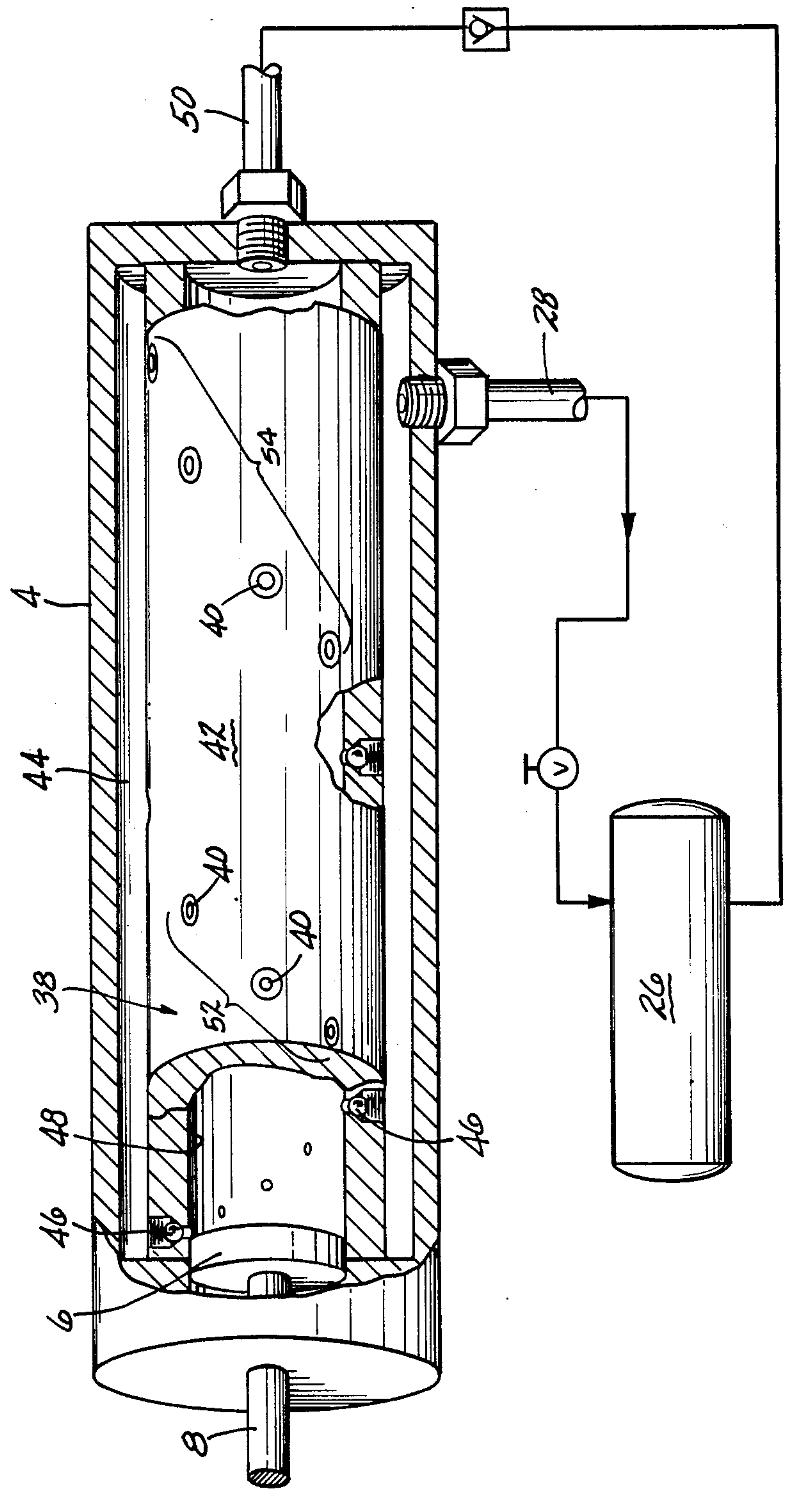
FIG. 4 is a perspective partially sectioned view of the hydraulic cylinder, sleeve and piston portions of the buffer which provides the staged braking of the steps.

The manner in which the braking action is applied in two separate stages will now be explained. Referring to FIG. 4, it will be noted that the cylinder 4 contains an internal sleeve 38 which is provided with a plurality of hydraulic fluid jets 40 arrayed in its side wall 42. The OD of the sleeve 38 is smaller than the ID of the cylinder 4 thereby providing an annular chamber 44 between the sleeve 38 and cylinder 4. The hose 28 to the reservoir 26 opens into the annular chamber 44. The fluid jets 40 include internal check valves 46 to prevent hydraulic fluid from flowing from the annular chamber 44 to the interior 48 of the sleeve 38. A second hose 50 connects the reservoir 26 with the interior 48 of the sleeve 38 so that the interior 48 of the sleeve 38 will normally be filled with hydraulic fluid. The piston 6 is normally positioned at the end of the sleeve 38 remote from the hose 50. The check valves 46 will prevent hydraulic fluid from flowing into the annular chamber 44 so long as the piston 6 remains in the position shown in FIG. 4. The fluid jets 40 are disposed in two stages 52 and 54 which form spirals in the sleeve wall. The jets 40 in the first stage 52 have a smaller diameter than the jets 40 in the second stage 54. Additionally, as shown schematically in FIG. 5, the spacing between jets 40 in each stage 52 and 54 varies along the axis of the sleeve 38.

When the piston 6 is driven into the sleeve 38, the hydraulic fluid is forced out of the sleeve through the jets 40. The double staging will allow a maximum deceleration which cannot be exceeded regardless of whether the escalator is full or empty. The braking distance and the deceleration can be adjusted by changing the specifics of the double stages. Most of the braking energy formed in the system is converted to heat by swirling the hydraulic fluid through the jets 40 and in the annular chamber 44.

One specific stage parameter set which can be used to achieve a maximum deceleration of 0.91 $M/S^2$ with an empty escalator is a 150 mm length piston stroke in the first stage, and with a fully loaded escalator in an additional 300 mm piston stroke using both stages is as follows:

| Stage 1 with jet diameter of 4 mm: | | | | | | | | | |
|---|---|---|---|---|---|---|---|---|---|
| jet number | 1 | 2 | 3 | 4 | 5 | 6 | 7 | 8 | 9 |
| piston dist. mm | 1.9 | 7.4 | 16.7 | 29.6 | 46.3 | 66.7 | 90.7 | 118.5 | 150 |

| Stage 2 with jet diameter of 5 mm: | | | | | |
|---|---|---|---|---|---|
| jet number | 1 | 2 | 3 | 4 | 5 |
| piston dist. mm | 12 | 48 | 108 | 192 | 300 |

Figure 6:
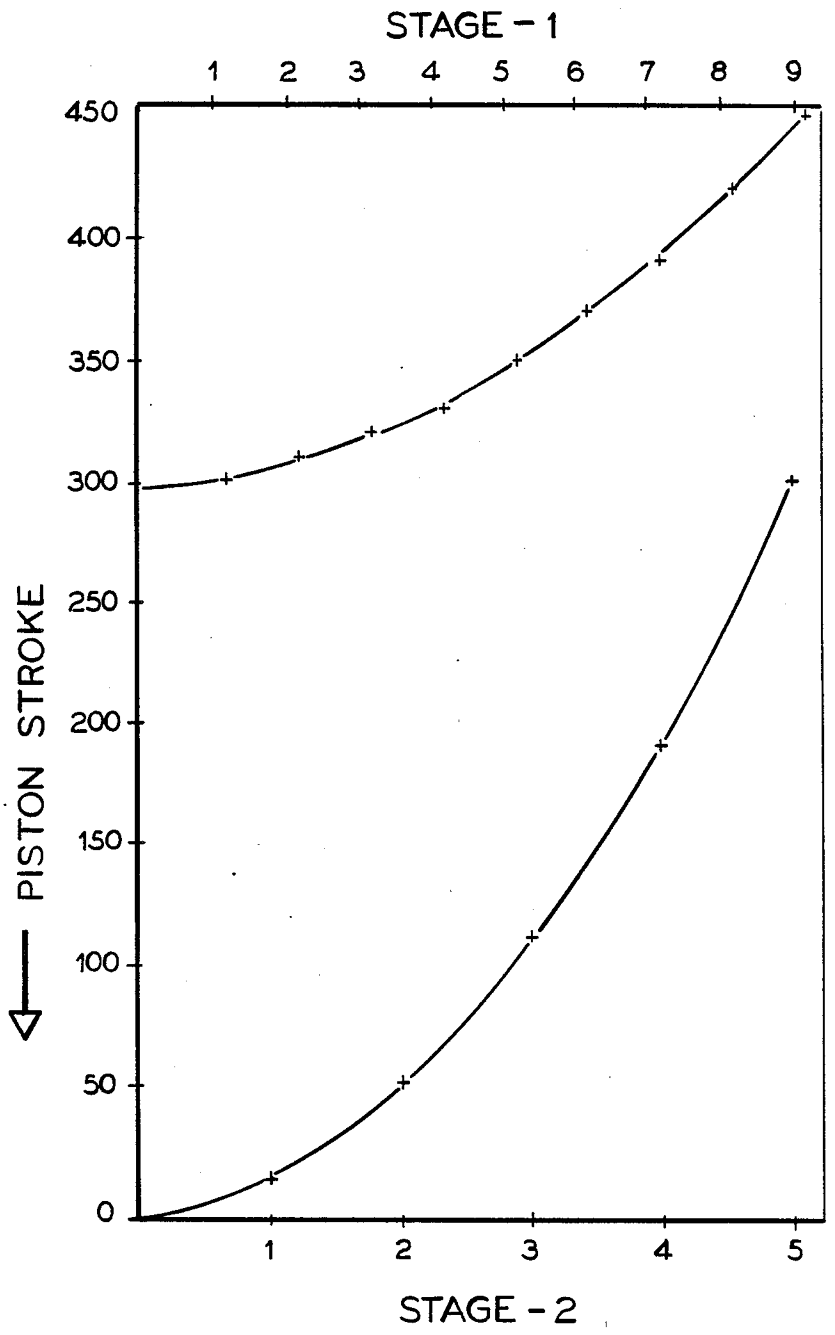
FIG. 6 is a graphic representation of the piston movement in a two stage embodiment of the invention.

FIG. 6 illustrates the piston stroke through the two stages, with the Y axis defining the length of the piston stroke from top to bottom, where the upper Y axis defines the distance between jets 40 in the first stage 52, and the lower Y axis defines the distance between jets 40 in the second stage 54. As previously noted, the device can stop an empty escalator using the first stage only, and can stop a heavily or fully loaded escalator using both stages and in both cases the deceleration rate will be controlled and will not exceed a maximum predetermined value.

It will be appreciated that the brake assembly of this invention is versatile and dependable, and will automatically adjust operation for lightly or heavily loaded escalators. The braking force will be initially softly applied so as not to jolt passengers, and the total distance needed to stop the escalator will not exceed a preset distance irrespective of how heavily loaded the escalator is. The energy created by application of the assembly is converted largely to heat by swirling the hydraulic fluid in the device.

Since many changes and variations of the disclosed embodiment of the invention may be made without departing from the inventive concept, it is not intended to limit the invention otherwise than is required by the appended claims.

What is claimed is:

1. A buffer assembly for emergency stopping of escalator steps in the event of escalator malfunction, said buffer assembly comprising:

a) a cylinder assembly for holding a buffering fluid, said cylinder assembly comprising an outer cylinder housing and an inner sleeve contained in said housing, said sleeve being inwardly spaced from said housing to form an annular space therebetween;

b) a fluid reservoir apart from said cylinder assembly, said reservoir being connected to said annular space by first conduit means;

c) a piston slideably telescoped into said sleeve and reciprocally movable therein, said piston including a piston rod extending from said cylinder assembly;

d) a catch mounted on said piston rod and normally disposed adjacent to but out of a path of movement of a step component of the escalator;

e) means for moving said catch to a step component-engaging position responsive to escalator malfunction whereupon said piston is driven into said sleeve; and f) said sleeve being provided with at least two different adjacent gradients of fluid jets for bleeding fluid from said sleeve into said annular space operable to provide staged braking of said piston in said sleeve whereby the escalator will stop within a predetermined distance after engagement by said catch irrespective of the load on the escalator.

2. The buffer assembly of claim 1 wherein said fluid jets include check valves operable to allow only one way fluid flow from said sleeve to said annular space.

3. The buffer assembly of claim 2 further comprising second conduit means interconnecting said reservoir and said sleeve for return flow of fluid from said reservoir to said sleeve after actuation of the buffer assembly.

4. The buffer assembly of claim 1 wherein each of said gradients of fluid jets contains a different number of fluid jets arranged in a helical pattern on said sleeve.

5. The buffer assembly of claim 4 wherein a first one of said gradients which said piston traverses first, contains more of said fluid jets than the next adjacent gradient, and the jets in said first gradient are spaced closer together as measured along the axis of said sleeve than the jets in said next adjacent gradient.

6. The buffer assembly of claim 5 wherein the diameter of the jets in said first gradient is smaller than the diameter of the jets in said next adjacent gradient.

* * * * *